United States Patent
Novak et al.

(10) Patent No.: US 12,405,811 B2
(45) Date of Patent: Sep. 2, 2025

(54) SYSTEM AND METHOD TO CAPTURE DIGITAL EXPERIENCES TO SUPPORT GUIDED TRAINING, PROCESS AND PROCEDURES AND JOB AIDS

(71) Applicant: JPMorgan Chase Bank, N.A., New York, NY (US)

(72) Inventors: Jamie Novak, Sunbury, OH (US); Paul D Magasiny, Kennett Square, PA (US); David Selph, Darien, CT (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 115 days.

(21) Appl. No.: 18/209,176

(22) Filed: Jun. 13, 2023

(65) Prior Publication Data
US 2024/0419462 A1 Dec. 19, 2024

(51) Int. Cl.
*G06F 9/451* (2018.01)
*G06F 11/3604* (2025.01)
(Continued)

(52) U.S. Cl.
CPC .......... *G06F 9/453* (2018.02); *G06F 11/3612* (2013.01); *G06F 11/3684* (2013.01);
(Continued)

(58) Field of Classification Search
CPC ............. G06F 11/3612; G06F 11/3684; G06F 11/3688; G06Q 10/063; G06Q 10/067
See application file for complete search history.

(56) References Cited

U.S. PATENT DOCUMENTS 11,106,569 B1 * 8/2021 Chapagain .......... G06F 11/3688
2007/0288246 A1 * 12/2007 Ebert .................. G06Q 30/0203
715/780

(Continued)

OTHER PUBLICATIONS

"DejaView: a personal virtual computer recorder", taken from https://dl.acm.org/doi/10.1145/1323293.1294289, by Laadan et al., 6 pages (Year: 2007).*

*Primary Examiner* — William L Bashore
*Assistant Examiner* — Gregory A Distefano
(74) *Attorney, Agent, or Firm* — GREENBLUM & BERNSTEIN, P.L.C.

(57) ABSTRACT

Various methods and processes, apparatuses/systems, and media for systemically and dynamically capturing digital experiences are disclosed. This disclosure presents methods and apparatuses for implementing a platform, language, cloud, and database agnostic automatic digital experiences capturing module configured to systemically and dynamically capture digital experiences to support guided training, process and procedures, and job aids. Customer journeys and corresponding validation steps are defined; test scenarios and defines test execution parameters are built. These definitions and configurations built are called by a scheduler, on a recurring basis, which executes the test scenarios against a system under test; and captures the resulting screenshots, videos, and interactions including highlights on image of user required selections. Results are then published and captured into an Experience database. A narrative author adds instructional text or context narratives which are linked to test scenario steps to the database.

20 Claims, 6 Drawing Sheets

(51) Int. Cl.
*G06F 11/3668* (2025.01)
*G06Q 10/063* (2023.01)
*G06Q 10/067* (2023.01)

(52) U.S. Cl.
CPC ....... *G06F 11/3688* (2013.01); *G06Q 10/063* (2013.01); *G06Q 10/067* (2013.01)

(56) References Cited

U.S. PATENT DOCUMENTS

| | | | |
|---|---|---|---|
| 2008/0244524 A1* | 10/2008 | Kelso | G06F 11/3688 717/124 |
| 2011/0252405 A1* | 10/2011 | Meirman | G06F 11/3692 717/125 |
| 2013/0298018 A1* | 11/2013 | Aqrawi | G06F 11/3438 715/704 |
| 2014/0181626 A1* | 6/2014 | Feltham | G06F 40/197 715/203 |
| 2015/0339213 A1* | 11/2015 | Lee | G06F 3/0484 717/125 |
| 2015/0363304 A1* | 12/2015 | Nagamalla | G06F 11/3648 702/123 |
| 2017/0277625 A1* | 9/2017 | Shtuchkin | G06F 11/3688 |
| 2018/0150381 A1* | 5/2018 | Sharma | G06F 11/3684 |
| 2021/0349813 A1* | 11/2021 | Rao | G06F 11/3688 |

* cited by examiner

SYSTEM AND METHOD TO CAPTURE DIGITAL EXPERIENCES TO SUPPORT GUIDED TRAINING, PROCESS AND PROCEDURES AND JOB AIDS

TECHNICAL FIELD

This disclosure generally relates to data processing, and, more particularly, to methods and apparatuses for implementing a platform, language, cloud, and database agnostic automatic digital experiences capturing module configured to systemically and dynamically capture digital experiences to support guided training, process and procedures, and job aids.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business process repository (document management) tools. For instance, software has been directed to data monitoring, customer help, performance analysis, project tracking, and competitive analysis, to name but a few. In general, large enterprises, corporations, agencies, institutions, and other organizations are facing a continuing problem of handling, processing, and/or accurately describing a vast amount of data and user experiences that are crucial to help support guided training to end users, customers and customer contact specialist, employees.

For example, ongoing support and maintenance by utilizing conventional tools to create visual aids to support user (i.e., customer contact specialist or end user) training of a digital experience has traditionally been a cumbersome, time consuming and expensive endeavor especially for large scale enterprise digital solutions with multiple updates per year. These conventional tools, as utilized today, are static in nature and typically require manual creation and editing of static content. Moreover, these conventional tools may not be easy to use, and may prove to be extremely challenging to keep up-to-date with production web and mobile journeys.

Thus, there is a need for an advanced method and tools that can address these conventional shortcomings corresponding to application development, content development, testing and delivery.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic automatic digital experiences capturing module configured to systemically and dynamically capture and display digital experiences to support guided training, process and procedures, and job aids, but the disclosure is not limited thereto.

According to exemplary embodiments, a user may define customers journeys, validation steps, test scenarios, and test parameters, but the disclosure is not limited thereto. A scheduler, based on the test parameters, may identify when the tests should execute, and may instruct a test server to execute the validation steps and the test scenarios. A test execution platform may execute the validation steps and test scenarios and may capture and publish the screens, images, and videos of the test, but the disclosure is not limited thereto.

An experience server, according to exemplary embodiments, may capture the test results and store an independent copy into a database.

In addition, a narrative author may add annotations to the test scenarios and such annotations may be stored in the database with the test scenarios, screenshots, videos, etc. The resulting captured customer journeys are presented by an application to an end user so that he/she can see digital experiences representing customer journeys.

The application, as disclosed herein, provides tools to allow an end user to search by customer journey, device, operating system, browser type, language, and any other relevant variable, but the disclosure is not limited thereto.

Moreover, the resulting captured customer journeys may be accessed by an application that an end user leverages to see digital experiences representing the customer journeys. The processor systemically and dynamically retrieves the digital experiences from the database; and the end user views the stored experiences via an application.

The results of this disclosure may provide continually updated versions of the customer journeys across device types, operating systems, and browser/application types to an end user.

For example, the present disclosure, through one or more of its various aspects, embodiments, and/or specific features or sub-components, provides, among other features, various systems, servers, devices, methods, media, programs, and platforms for implementing a platform, language, database, and cloud agnostic automatic digital experiences capturing module configured to implement a process for automating the systemic maintenance of documentation by defining customer journey validation scripts. The process as implemented by the automatic digital experiences capturing module may be broken down into a multi-phase set of activities which may result in both interactive (e.g., video) and static (e.g., image) documentation which may allow an experience to be generically displayed without security entitlement encumberments and genericized customer data. The process as disclosed herein may be designed to be automated and re-run on a scheduled or configurable periodic basis. In addition, the process as implemented by the automatic digital experiences capturing module may be configured to: manage the customer journeys and detailed validation steps including version control; determine the frequency of automated refresh of the capture process; provide a unique identifier for the customer journey and validation step; expose the inventory of customer journey and validation steps to knowledge management systems for indexing and access, etc., but the disclosure is not limited thereto.

According to exemplary embodiments, a method for systemically and dynamically capturing digital experiences by utilizing one or more processors along with allocated memory is disclosed. The method may include: defining customer journeys; defining corresponding validation steps needed to accomplish the defined customer journey; building test scenarios corresponding to the defined validation steps; defining, in response to building the test scenarios, test execution parameters; executing the test scenarios based on the test execution parameters; feeding the defined validation steps, in response to a positive test result, into a capture process that automatically navigates a system under test and captures resulting screenshots to support the defined customer journey including highlights on image of user required selections; and storing the validation steps, test scenarios and resulting screenshots and videos on to a database, wherein the resulting screenshots and videos are accessed by an application that an end user leverages to see digital experiences to facilitate the customer journey.

According to exemplary embodiments, the method may further include: creating additional contents as overlays of the digital experience; linking test results to annotations using a unique ID as a key link along with the overlays; and displaying the overlays to the user of the application presenting the digital experience.

According to exemplary embodiments, the method may further include: defining the corresponding validation steps needed to accomplish the defined customer journey in end-user friendly narratives.

According to exemplary embodiments, the method may further include: annotating end-user guide notes and texts or user-friendly narratives corresponding to the defined customer journey; automatically applying the annotated end-user guide notes and texts or user-friendly narratives in refreshed execution of the test scenarios and documentation and linking annotations to the customer journey validation step.

According to exemplary embodiments, in defining the test execution parameters, the method may further include; defining device type (i.e., desktop, laptop, tablet, etc.); defining operating system; defining browser type; and defining desired configurable language.

According to exemplary embodiments, the method may further include: assigning a unique identifier for the customer journey and each validation step for linking to the overlay annotation narrative.

According to exemplary embodiments, the method may further include: automatically executing the test scenarios on a timed or regular basis or on demand.

According to exemplary embodiments, the captured digital experiences may include search of customer journeys and selection of operating system, language, and/or browser selection options.

According to exemplary embodiments, the method may further include: dynamically updating customer journey validation scripts such that the customer journey automatically inherits the updates; and automatically running a customer journey validation script with the inherited updates at a subsequent scheduled time.

According to exemplary embodiments, in executing the test scenarios, the method the method may further include; capturing, by a test execution platform, screen shots and animations or videos of each digital experience, wherein links to each test step is captured to provide ability to later link the test step to a narrative using the unique ID for a step which is displayed to the end user via the user interface.

According to exemplary embodiments, the user interface may be configured to allow narrative authors to capture and link appropriate narratives to each step in a test scenario; and display the narratives in conjunction with corresponding screen shots.

According to exemplary embodiments, a system for systemically and dynamically capturing digital experiences is disclosed. The system may include; a processor; and a memory operatively connected to the processor via a communication interface, the memory storing computer readable instructions, when executed, may cause the processor to: define customer journeys; define corresponding validation steps needed to accomplish the defined customer journey; build test scenarios corresponding to the defined validation steps; define, in response to building the test scenarios, test execution parameters; execute the test scenarios based on the test execution parameters; feed the defined validation steps, in response to a positive test result, into a capture process that automatically navigates a system under test and captures resulting screenshots to support the defined customer journey including highlights on image of user required selections; and store the validation steps, test scenarios and resulting screenshots and videos on to a database, wherein the resulting screenshots and videos are accessed by an application that an end user leverages to see digital experiences to facilitate the customer journey.

According to exemplary embodiments, the processor may be further configured to: define the corresponding validation steps needed to accomplish the defined customer journey in end-user friendly narratives.

According to exemplary embodiments, the processor may be further configured to: annotate end-user guide notes and texts or user-friendly narratives corresponding to the defined customer journey; and automatically apply the annotated end-user guide notes and texts or user-friendly narratives in refreshed execution of the test scenarios and documentation.

According to exemplary embodiments, in defining the test execution parameters, the processor may be further configured to: define device type (i.e., desktop, laptop, tablet, etc.); define operating system; define browser type; and define desired configurable language.

According to exemplary embodiments, the processor may be further configured to: assign a unique identifier for the customer journey and each validation step for linking to the overlay annotation narrative.

According to exemplary embodiments, the processor may be further configured to: automatically execute the test scenarios on a timed or regular basis or on demand.

According to exemplary embodiments, the processor may be further configured to: dynamically update customer journey validation scripts such that the customer journey automatically inherits the updates; and automatically run a customer journey validation script with the inherited updates at a subsequent scheduled time.

According to exemplary embodiments, in executing the test scenarios, the processor may be further configured to: capture, by a test execution platform, screen shots and animations or videos of each digital experience, wherein links to each test step is captured to provide ability to later link the test step to a narrative using the unique ID for a step which is displayed to the end user via the user interface.

According to exemplary embodiments, a non-transitory computer readable medium configured to store instructions for systemically and dynamically capturing digital experiences is disclosed. The instructions, when executed, may cause a processor to perform the following: defining customer journeys; defining corresponding validation steps needed to accomplish the defined customer journey; building test scenarios corresponding to the defined validation steps; defining, in response to building the test scenarios, test execution parameters; executing the test scenarios based on the test execution parameters; feeding the defined validation steps, in response to a positive test result, into a capture process that automatically navigates a system under test and captures resulting screenshots to support the defined customer journey including highlights on image of user required selections; and storing the validation steps, test scenarios and resulting screenshots and videos on to a database, wherein the resulting screenshots and videos are accessed by an application that an end user leverages to see digital experiences to facilitate the customer journey.

According to exemplary embodiments, the instructions, when executed, may cause the processor to further perform the following: defining the corresponding validation steps needed to accomplish the defined customer journey in end-user friendly narratives.

According to exemplary embodiments, the instructions, when executed, may cause the processor to further perform the following: annotating end-user guide notes and texts or user-friendly narratives corresponding to the defined customer journey; and automatically applying the annotated end-user guide notes and texts or user-friendly narratives in refreshed execution of the test scenarios and documentation.

According to exemplary embodiments, in defining the test execution parameters, the instructions, when executed, may cause the processor to further perform the following: defining device type (i.e., desktop, laptop, tablet, etc.); defining operating system; defining browser type; and defining desired configurable language.

According to exemplary embodiments, the instructions, when executed, may cause the processor to further perform the following: assigning a unique identifier for the customer journey and each validation step for linking to the overlay annotation narrative.

According to exemplary embodiments, the instructions, when executed, may cause the processor to further perform the following: automatically executing the test scenarios on a timed or regular basis or on demand.

According to exemplary embodiments, the instructions, when executed, may cause the processor to further perform the following: dynamically updating customer journey validation scripts such that the customer journey automatically inherits the updates; and automatically running a customer journey validation script with the inherited updates at a subsequent scheduled time.

According to exemplary embodiments, in executing the test scenarios, the instructions, when executed, may cause the processor to further perform the following: capturing, by a test execution platform, screen shots and animations or videos of each digital experience, wherein links to each test step is captured to provide ability to later link the test step to a narrative using the unique ID for a step which is displayed to the end user via the user interface.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
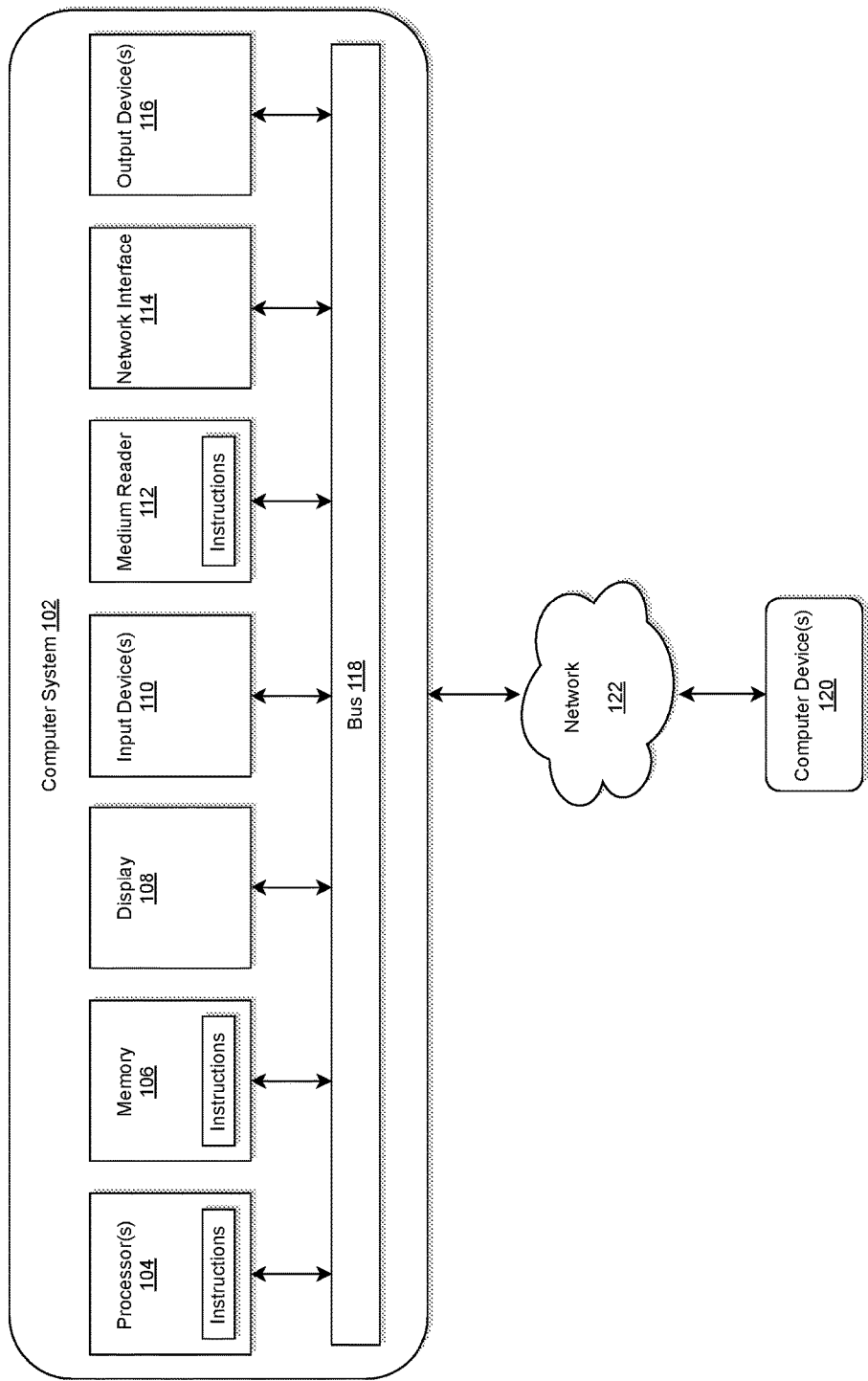
FIG. 1 illustrates a computer system for implementing a platform, language, database, and cloud agnostic automatic digital experiences capturing module configured to automatically and dynamically capture digital experiences to support guided training, process and procedures, and job aids in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic automatic digital experiences capturing module configured to automatically and dynamically capture digital experiences to support guided training, process and procedures, and job aids in accordance with an exemplary embodiment.

The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the automatic digital experiences capturing module may be platform, language, database, and cloud agnostic that may allow for consistent easy orchestration and passing of data through various components to output a desired result regardless of platform, browser, language, database, and cloud environment. Since the disclosed process, according to exemplary embodiments, is platform, language, database, browser, and cloud agnostic, the automatic digital experiences capturing module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
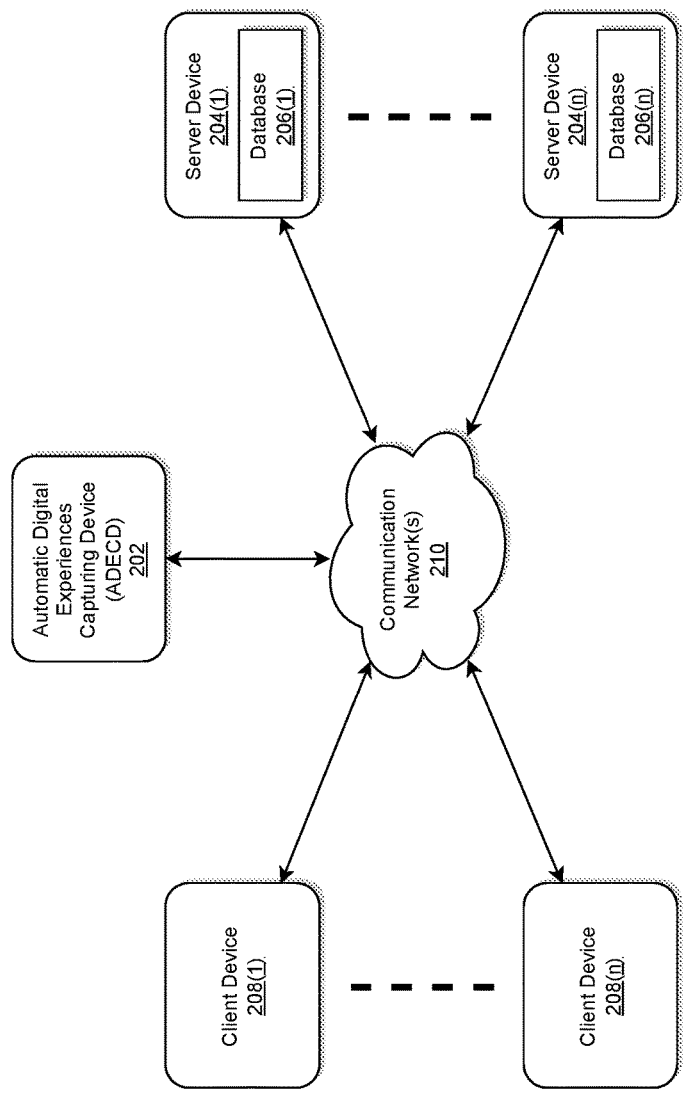
FIG. 2 illustrates an exemplary diagram of a network environment with a platform, language, database, and cloud agnostic automatic digital experiences capturing device in accordance with an exemplary embodiment.

Referring to FIG. 2, a schematic of an exemplary network environment 200 for implementing a language, platform, database, and cloud agnostic automatic digital experiences capturing device (ADECD) of the instant disclosure is illustrated.

According to exemplary embodiments, the above-described problems associated with conventional tools may be overcome by implementing an ADECD 202 as illustrated in FIG. 2 that may be configured for implementing a platform, language, database, and cloud agnostic automatic digital experiences capturing module configured to systemically and dynamically capture digital experiences to support guided training, process and procedures, and job aids, but the disclosure is not limited thereto.

The ADECD 202 may have one or more computer system 102s, as described with respect to FIG. 1, which in aggregate provide the necessary functions.

The ADECD 202 may store one or more applications that can include executable instructions that, when executed by the ADECD 202, cause the ADECD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ADECD 202 itself, may be located in virtual server(s) running in a cloud-based computing environment rather than being tied to one or more specific physical network computing devices. Also, the application(s) may be running in one or more virtual machines (VMs) executing on the ADECD 202. Additionally, in one or more embodiments of this technology, virtual machine(s) running on the ADECD 202 may be managed or supervised by a hypervisor.

In the network environment 200 of FIG. 2, the ADECD 202 is coupled to a plurality of server devices 204(1)-204(n) that hosts a plurality of databases 206(1)-206(n), and also to a plurality of client devices 208(1)-208(n) via communication network(s) 210. A communication interface of the ADECD 202, such as the network interface 114 of the computer system 102 of FIG. 1, operatively couples and communicates between the ADECD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG.

1, although the ADECD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ADECD 202 may be a standalone device or integrated with one or more other devices or apparatuses, such as one or more of the server devices 204(1)-204(n), for example. In one particular example, the ADECD 202 may be hosted by one of the server devices 204(1)-204(n), and other arrangements are also possible. Moreover, one or more of the devices of the ADECD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ADECD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ADECD 202 that may efficiently provide a platform for implementing a platform, language, database, and cloud agnostic automatic digital experiences capturing module configured to automatically and dynamically capture digital experiences to support guided training, process and procedures, and job aids, but the disclosure is not limited thereto.

The client devices 208(1)-208(n) may run interface applications, such as standard web browsers or standalone client applications, which may provide an interface to communicate with the ADECD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ADECD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the ADECD 202, the server devices 204(1)-204(n), or the client devices 208(1)-208(n), for example, may be configured to operate as virtual instances on the same physical machine. For example, one or more of the ADECD 202, the server devices 204(1)-204(n), or the client devices 208(1)-208(n) may operate on the same physical device rather than as separate devices communicating through communication network(s) 210. Additionally, there may be more or fewer ADECDs 202, server devices 204(1)-204(n), or client devices 208(1)-208(n) than illustrated in FIG. 2. According to exemplary embodiments, the ADECD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
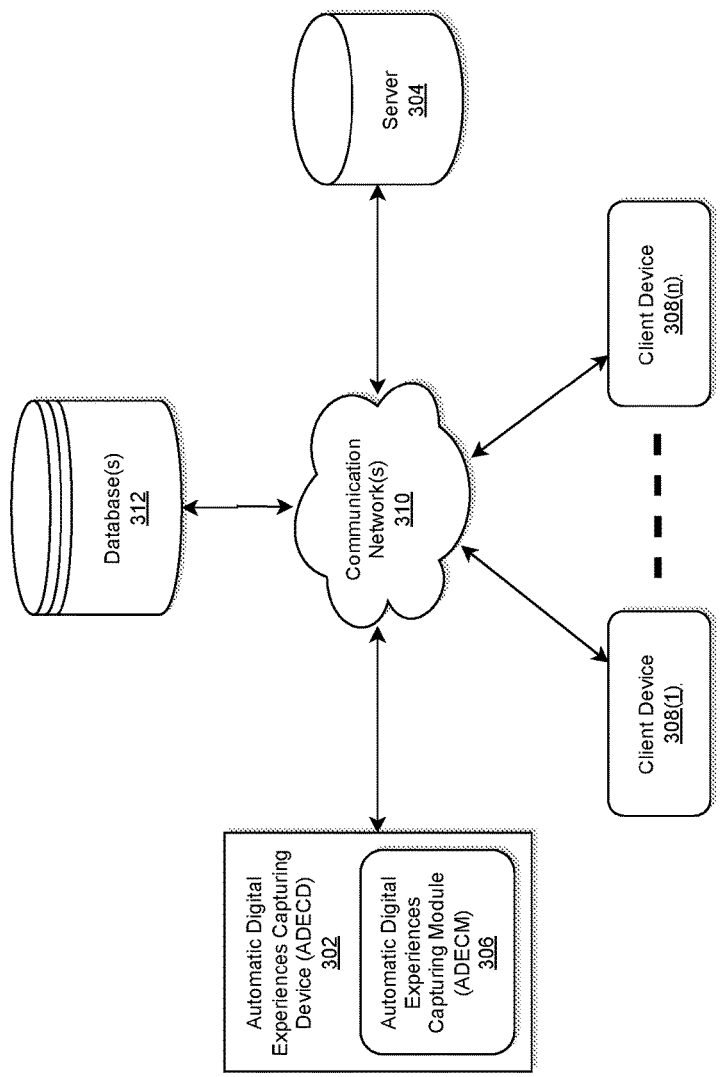
FIG. 3 illustrates a system diagram for implementing a platform, language, database, and cloud agnostic automatic digital experiences capturing device having a platform, language, database, and cloud agnostic automatic digital experiences capturing module in accordance with an exemplary embodiment.

FIG. 3 illustrates a system diagram for implementing a platform, language, and cloud agnostic ADECD having a platform, language, database, and cloud agnostic automatic digital experiences capturing module (ADECM) in accordance with an exemplary embodiment.

As illustrated in FIG. 3, the system 300 may include an ADECD 302 within which an ADECM 306 is embedded, a server 304, a database(s) 312, a plurality of client devices 308(1) . . . 308(n), and a communication network 310.

According to exemplary embodiments, the ADECD 302 including the ADECM 306 may be connected to the server 304, and the database(s) 312 via the communication network 310. The ADECD 302 may also be connected to the plurality of client devices 308(1) . . . 308(n) via the communication network 310, but the disclosure is not limited thereto.

According to exemplary embodiment, the ADECD 302 is described and shown in FIG. 3 as including the ADECM 306, although it may include other rules, policies, modules, databases, or applications, for example. According to exemplary embodiments, the database(s) 312 may be configured to store ready to use modules written for each Application Programming Interface (API) for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the ADECM 306 may be configured to receive real-time feed of data from the plurality of client devices 308(1) . . . 308(n) and secondary sources via the communication network 310.

As may be described below, the ADECM 306 may be configured to: define customer journeys; define corresponding validation steps needed to accomplish the defined customer journey; build test scenarios corresponding to the defined validation steps; define, in response to building the test scenarios, test execution parameters; execute the test scenarios based on the test execution parameters; feed the defined validation steps, in response to a positive test result, into a capture process that automatically navigates a system under test and captures resulting screenshots to support the defined customer journey including highlights on image of user required selections; store the validation steps, test scenarios and resulting screenshots and videos on to a database, wherein the resulting screenshots and videos are accessed by an application that an end user leverages to see digital experiences to facilitate the customer journey; systemically and dynamically capture the digital experiences from the database; and present the captured digital experiences onto a user interface implemented onto the application, but the disclosure is not limited thereto.

The plurality of client devices 308(1) . . . 308(n) are illustrated as being in communication with the ADECD 302. In this regard, the plurality of client devices 308(1) . . . 308(n) may be "clients" (e.g., customers) of the ADECD 302 and are described herein as such. Nevertheless, it is to be known and understood that the plurality of client devices 308(1) . . . 308(n) need not necessarily be "clients" of the ADECD 302, or any entity described in association therewith herein. Any additional or alternative relationship may exist between either or both of the plurality of client devices 308(1) . . . 308(n) and the ADECD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the ADECD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The ADECD 302 may be the same or similar to the ADECD 202 as described with respect to FIG. 2, including any features or combination of features described with respect thereto.

Figure 4:
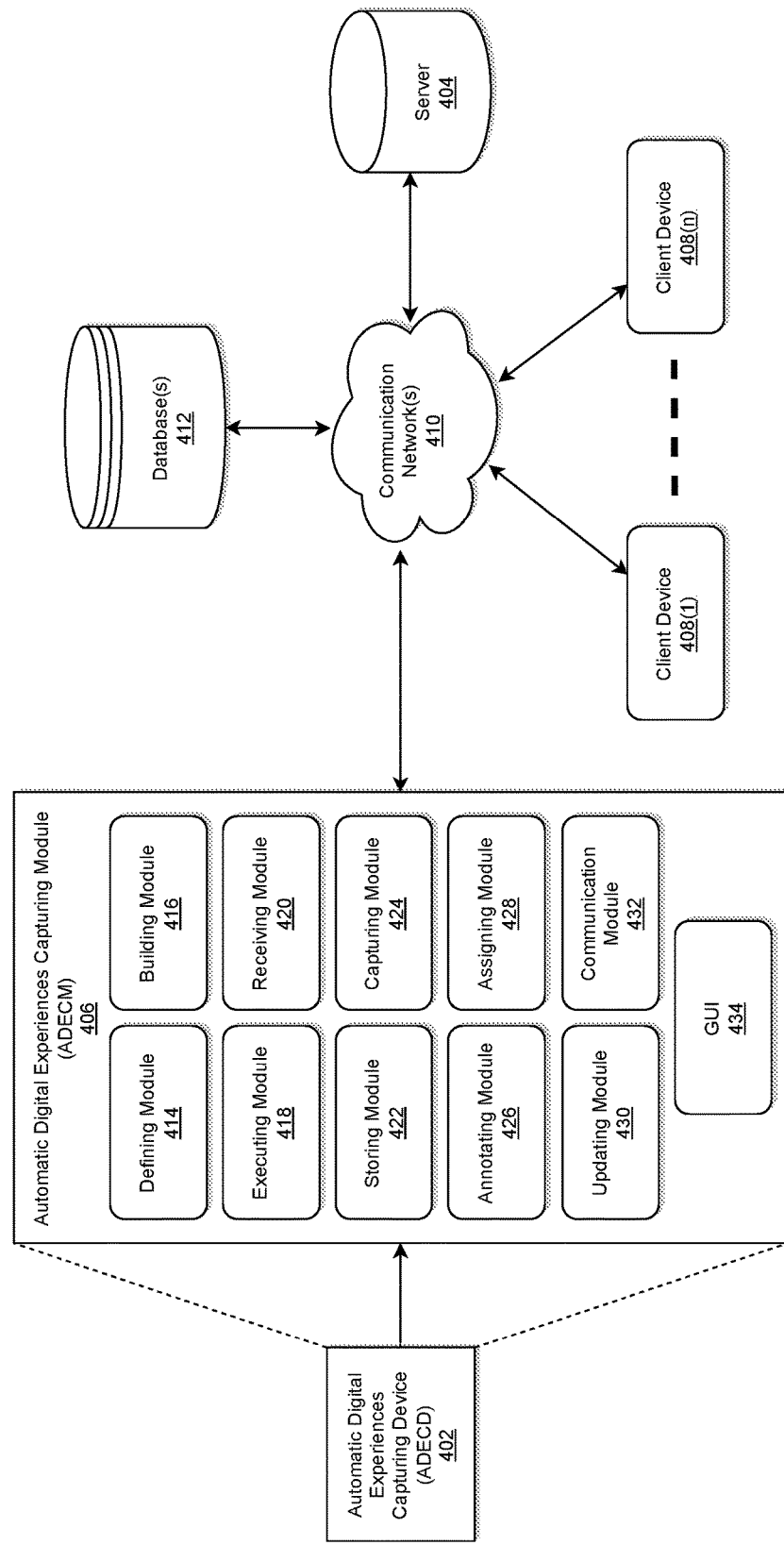
FIG. 4 illustrates a system diagram for implementing a platform, language, database, and cloud agnostic automatic digital experiences capturing module of FIG. 3 in accordance with an exemplary embodiment.

FIG. 4 illustrates a system diagram for implementing a platform, language, database, and cloud agnostic ADECM of FIG. 3 in accordance with an exemplary embodiment.

According to exemplary embodiments, the system 400 may include a platform, language, database, and cloud agnostic ADECD 402 within which a platform, language, database, and cloud agnostic ADECM 406 is embedded, a server 404, database(s) 412, and a communication network 410. According to exemplary embodiments, server 404 may comprise a plurality of servers located centrally or located in different locations, but the disclosure is not limited thereto.

According to exemplary embodiments, the ADECD 402 including the ADECM 406 may be connected to the server 404 and the database(s) 412 via the communication network 410. The ADECD 402 may also be connected to the plurality of client devices 408(1)-408(n) via the communication network 410, but the disclosure is not limited thereto. The ADECM 406, the server 404, the plurality of client devices 408(1)-408(n), the database(s) 412, the communication network 410 as illustrated in FIG. 4 may be the same or similar to the ADECM 306, the server 304, the plurality of client devices 308(1)-308(n), the database(s) 312, the communication network 310, respectively, as illustrated in FIG. 3.

According to exemplary embodiments, as illustrated in FIG. 4, the ADECM 406 may include a defining module 414, a building module 416, an executing module 418, a receiving module 420, a storing module 422, a capturing module 424, an annotating module 426, an assigning module 428, an updating module 430, a communication module 432, and a GUI 434. According to exemplary embodiments, interactions and data exchange among these modules included in the ADECM 406 provide the advantageous effects of the disclosed invention. Functionalities of each module of FIG. 4 may be described in detail below with reference to FIGS. 4-6.

According to exemplary embodiments, each of the defining module 414, the building module 416, the executing module 418, the receiving module 420, the storing module 422, the capturing module 424, the annotating module 426, the assigning module 428, the updating module 430, and the communication module 432 of the ADECM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the defining module 414, the building module 416, the executing module 418, the receiving module 420, the storing module 422, the capturing module 424, the annotating module 426, the assigning module 428, the updating module 430, and the communication module 432 of the ADECM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the defining module 414, the building module 416, the executing module 418, the receiving module 420, the storing module 422, the capturing module 424, the annotating module 426, the assigning module 428, the updating module 430, and the communication module 432 of the ADECM 406 of FIG. 4 may be implemented by dedicated hardware, or as a combination of dedicated hardware to perform some functions and a processor (e.g., one or more programmed microprocessors and associated circuitry) to perform other functions, but the disclosure is not limited thereto. For example, the ADECM 406 of FIG. 4 may also be implemented by Cloud based deployment.

According to exemplary embodiments, each of the defining module 414, the building module 416, the executing module 418, the receiving module 420, the storing module 422, the capturing module 424, the annotating module 426, the assigning module 428, the updating module 430, and the communication module 432 of the ADECM 406 of FIG. 4 may be called via corresponding API, but the disclosure is not limited thereto. For example, calls may also be made using Event based message interfaces in addition to APIs.

According to exemplary embodiments, the process implemented by the ADECM 406 may be executed via the communication module 432 and the communication network 410, which may comprise plural networks as described above. For example, in an exemplary embodiment, the various components of the ADECM 406 may communicate with the server 404, and the database(s) 412 via the communication module 432 and the communication network 410 and the results may be displayed onto the GUI 434. Of course, these embodiments are merely exemplary and are not limiting or exhaustive. The database(s) 412 may include the databases included within the private cloud and/or public cloud and the server 404 may include one or more servers within the private cloud and the public cloud.

According to exemplary embodiments, the defining module 414 may be configured to define customer journeys; and define corresponding validation steps needed to accomplish the defined customer journey. The building module 416 may be configured to build test scenarios corresponding to the defined validation steps. The defining module 414 may be further configured to define, in response to building the test scenarios, test execution parameters. The executing module 418 may be configured to execute the test scenarios based on the test execution parameters and the receiving module 420 may be configured to feed the defined validation steps, in response to a positive test result, into a capture process that automatically navigates a system under test and captures resulting screenshots to support the defined customer journey including highlights on image of user required selections.

According to exemplary embodiments, the storing module 422 may be configured to store the validation steps, test scenarios and resulting screenshots and videos on to the database(s) 412, wherein the resulting screenshots and videos are accessed by an application that an end user leverages to see digital experiences to facilitate the customer journey. The capturing module 424 may be configured to systemically and dynamically capture the digital experiences from the database(s) 412. The captured digital experiences may be presented onto the GUI 434 implemented onto the application.

According to exemplary embodiments, in defining the test execution parameters, the defining module 414 may be further configured to define device type (i.e., desktop, laptop, tablet, mobile, etc.); define operating system; define browser type; and define desired configurable language.

According to exemplary embodiments, the defining module 414 may be further configured to define the corresponding validation steps needed to accomplish the defined customer journey in end-user friendly narratives.

According to exemplary embodiments, the annotating module 426 may be configured to annotate end-user guide notes and texts or user-friendly narratives corresponding to the defined customer journey defined in module 414. The executing module 418 may be configured to automatically apply the annotated end-user guide notes and texts or user-friendly narratives in refreshed execution of the test scenarios and documentation.

According to exemplary embodiments, the assigning module 428 may be configured to assign a unique identifier for the customer journey and each validation step.

According to exemplary embodiments, the executing module 418 may be further configured to automatically execute the test scenarios on a timed or regular basis or on demand.

According to exemplary embodiments, the updating module 430 may be configured to dynamically update customer journey validation scripts such that the customer journey automatically inherits the updates; and the executing module 418 may be further configured to automatically run a new aggregated test journey with the inherited updates at a subsequent scheduled time or on demand.

According to exemplary embodiments, in executing the test scenarios, the capturing module 424 may be further configured to capture, by a test execution platform, screen shots and animations or videos of each digital experience, wherein links to each test step is captured to provide ability to later link the test step to a narrative which is displayed to the end user via the user interface.

According to exemplary embodiments, the GUI 434 may be configured to allow narrative authors to capture and link appropriate narratives to each step in a test scenario; and display the narratives in conjunction with corresponding screen shots.

Figure 5:
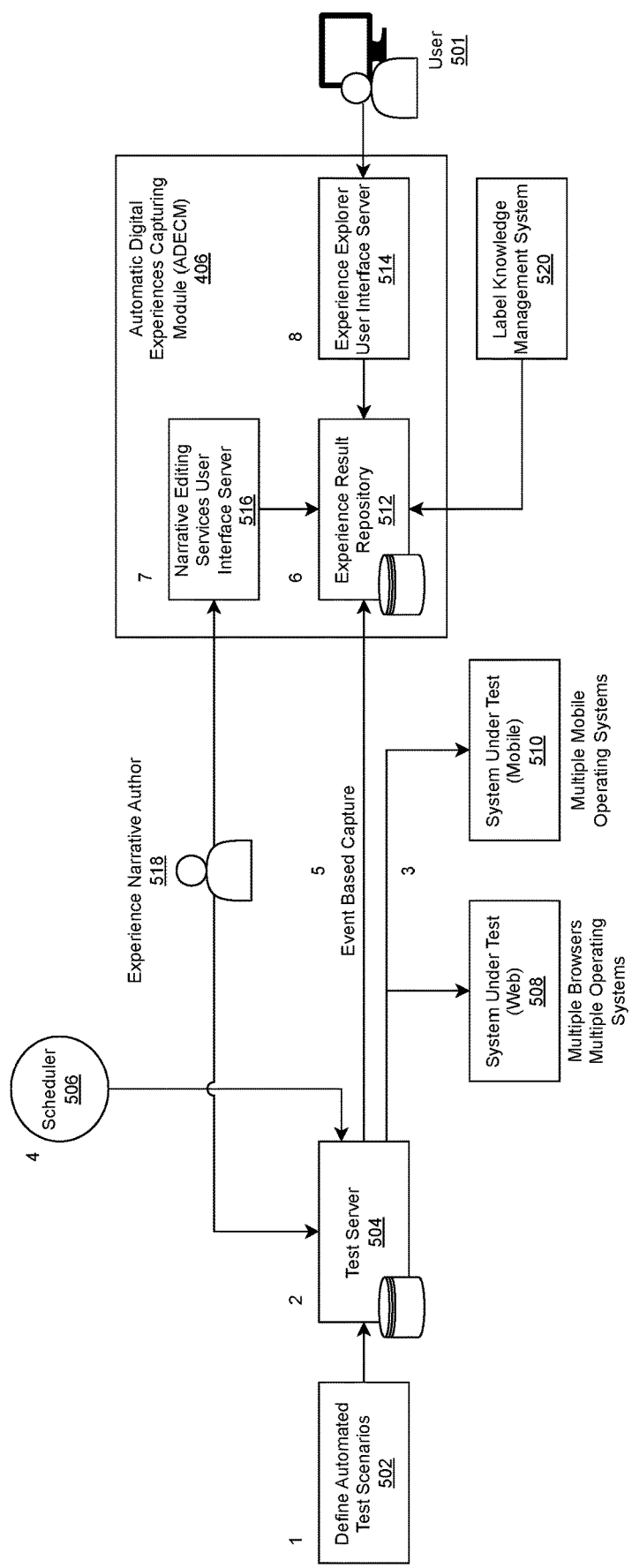
FIG. 5 illustrates an exemplary sequence diagram as implemented by the platform, language, database, and cloud agnostic automatic digital experiences capturing module of FIG. 4 in accordance with an exemplary embodiment.

For example, FIG. 5 illustrates an exemplary sequence diagram 500 as implemented by the platform, language, database, and cloud agnostic ADECM 406 of FIG. 4 in accordance with an exemplary embodiment.

According to exemplary embodiments, as illustrated in FIG. 5, at sequence 1 of the sequence diagram 500, automated test scenarios (i.e., journeys) 502 and the steps which reflect the journey are defined. At sequence 2 of the sequence diagram 500, corresponding test scenarios are built and stored onto a test server 504. At sequence 3 of the sequence diagram 500, test execution parameters are defined. According to exemplary embodiments, the test steps stored in the test server 504 including test parameters, are executed against systems under tests, i.e., 508 and 510, on a timed cycle based on schedules defined in sequence 4, as described below, based on predetermined time schedules. Test steps may also be triggered based on time, event, or manual request.

The test execution parameters may correspond to system under test (Web) 508 (i.e., multiple browsers and multiple operating systems) and system under test (mobile) 510 (i.e., multiple mobile operating systems and multiple mobile browsers).

According to exemplary embodiments, at sequence 4 of the sequence diagram 500, a scheduler 506 may schedule test execution time and at sequence 5 of the sequence diagram 500, tests with the test results published via events in sequence 5. At sequence 6 of the sequence diagram 500, test results are captured and stored onto an experience result repository 512. The experience result repository 512 may also receive data from the label knowledge management system 520. At sequence 7 of the sequence diagram 500, an experience narrative author 518 authors corresponding test narratives. The test narratives may be stored onto the test server 504 as well as onto a narrative editing services user interface server 516. Output data from the narrative editing services user interface server 516 may also be stored onto the experience result repository 512. At sequence 8 of the sequence diagram 500, the resulting screenshots are accessed by an application (i.e., an experience explorer user interface server 514) that an end user, i.e., user 501, leverages to see digital experiences representing the customer journey. An experience explorer user interface server 514 may be utilized by the user 501. Output from the experience explorer user interface server 514 may be input to the experience result repository 512. Output from the test server 504 may be input to the experience result repository 512.

As illustrated in FIG. 5, according to exemplary embodiments, the experience result repository 512, the experience explorer user interface server 514, and the narrative editing services user interface server 516, may be implemented within the ADCEM 406, but the disclosure is not limited thereto.

As illustrated above, with respect to FIGS. 4 and 5, according to exemplary embodiments, the ADECM 406 configured to implement a process for automating the systemic maintenance of documentation by defining customer journey validation scripts. The process as described herein with reference to FIGS. 4 and 5 and as implemented by the ADCEM 406 may be broken down into a multi-phase set of activities which may result in both interactive (e.g., video) and static (e.g., image, Web Page, PDF) documentation which may allow an experience to be generically displayed with genericized customer data and without security entitlement encumberments. The process as disclosed herein with reference to FIGS. 4 and 5 may be designed to be automated and re-run on a scheduled or configurable periodic basis.

In addition, the process as described herein with reference to FIGS. 4 and 5 and as implemented by the ADCEM 406 may be configured to: manage the customer journeys and detailed validation steps including version control; determine the frequency of automated refresh of the capture process; provide a unique identifier for the customer journey and validation step; expose the inventory of customer journey and validation steps to knowledge management systems for indexing and access, etc., but the disclosure is not limited thereto.

For example, according to exemplary embodiments, the ADCEM 406 may be configured to leverage a systemic testing platform in the User Acceptance Testing (UAT) and production environments, but the disclosure is not limited thereto. Tests may be written in readily-available open-source test automation tools. As demonstrated above, the test execution according to exemplary embodiments may support for multiple desktop/mobile operating system and browser types. Test execution is typically scheduled once per day but can be tuned as appropriate based on the volatility of the customer journey updates.

According to exemplary embodiments, results are augmented with user friendly narrative to facilitate the appropriate messaging to the end user and customer journeys are presented to end-users with scenario search and operating system and/or browser selection options-once the user-friendly narratives are created, they would automatically apply to refreshed test execution and documentation.

According to exemplary embodiments, the process as implemented by the ADCEM 406 may be utilized to create guided training, process and procedures and job aids. For example, the process as implemented by the ADCEM 406 may be utilized to support service contact centers, but the disclosure is not limited thereto. Additional use cases may include exposing content to customers for self-service.

According to exemplary embodiments, for test execution management implemented by the ADCEM 406, ongoing execution capture and storage of the customer journey executions are implemented for all targeted experiences including PC Web, Mac Web, IOS and Android, but the disclosure is not limited thereto. According to exemplary embodiments, execution of the capture process implemented by the ADCEM 406 may be structured in such a way that only fictitious accounts are used in order to maintain the privacy of the customers. This can prevent accidental exposure of personal private information.

According to exemplary embodiments, the ADCEM 406 may be configured to allow automated highlighting of the selected object and automated addition of supporting narrative to the page.

During the execution of the scenarios, according to exemplary embodiments, the test execution platform may capture screen shots and animations/videos of the experience. Links to the test steps may be captured to provide ability to later link the step to a narrative which may be displayed to the end user, i.e., user 501 as illustrated in FIG. 5. This data and image and/or animation and/or video may be published or pushed to the experience result repository 512 for capture and use by other experience services.

Referring to FIGS. 4 and 5, according to exemplary embodiments, the GUI 434 may be provided to allow narrative authors (i.e., experience narrative author 518) to capture and link appropriate narratives to each step in a scenario. This narrative may be displayed in conjunction with the screen image captures. The narrative and the linkage to the scenario steps may be housed in the experience result repository 512. Scenario steps may have a unique ID which is not the same as a runtime ID. This unique ID may not be changed across test executions.

According to exemplary embodiments, the ADCEM 406 may be configured to create an interactive user experience to present digital experiences relevant to the platform and customer journey of interest. This user interface may be created in such a way to allow standalone or embedded in the context of a parent application with the appropriate security access permissions for the role of the end-user, i.e., user 501 as illustrated in FIG. 5. The end user entitlement is for access to the interactive digital experience captured and is not related to the user entitlement of the production application. This allows users to provide insights on how to use specific customer journeys without the need for the user to have production security entitlement to that journey.

According to exemplary embodiments, by utilizing the GUI 434, the user 501 has the ability to: search for a scenario; select a platform/variant (Web/Mobile/Browser/OS/etc.); choose a desired language, i.e., English/Spanish (where available); navigate through a scenario/images; see the steps associated with the scenario; watch an animation/video of the scenario, but the disclosure is not limited thereto.

Figure 6:
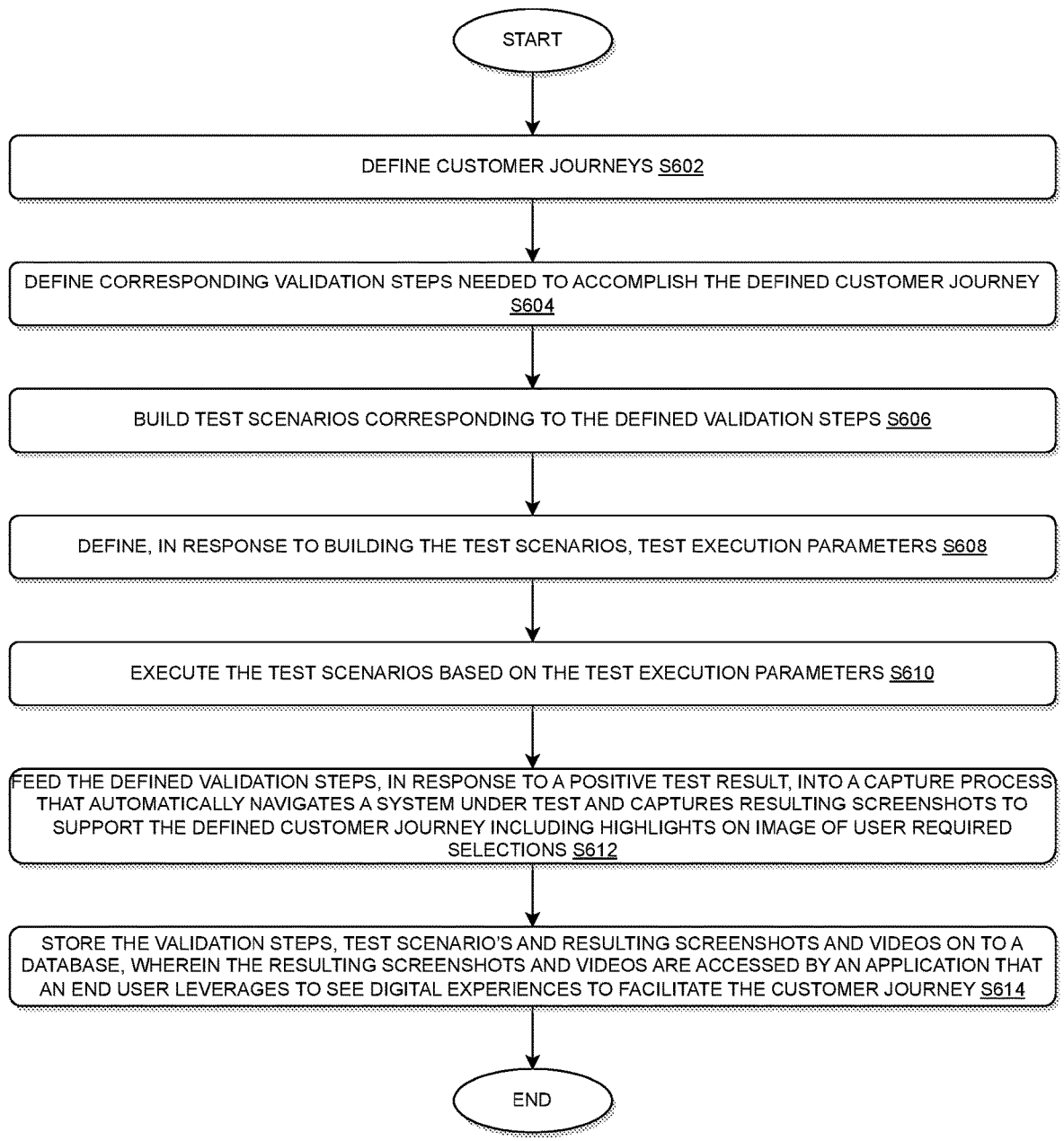
FIG. 6 illustrates an exemplary flow chart of a process implemented by the platform, language, database, and cloud agnostic automatic digital experiences capturing module of FIG. 4 for automatically and dynamically capturing digital experiences to support guided training, process and procedures, and job aids in accordance with an exemplary embodiment.

FIG. 6 illustrates an exemplary flow chart of a process 600 implemented by the platform, language, database, and cloud agnostic ADECM 406 of FIG. 4 for systemically and dynamically capturing digital experiences to support guided training, process and procedures, and job aids in accordance with an exemplary embodiment. It may be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include defining customer journeys.

At step S604, the process 600 may include defining corresponding validation steps needed to accomplish the defined customer journey.

At step S606, the process 600 may include building test scenarios corresponding to the defined validation steps.

At step S608, the process 600 may include defining, in response to building the test scenarios, test execution parameters.

At step S610, the process 600 may include executing the test scenarios based on the test execution parameters.

At step S612, the process 600 may include feeding the defined validation steps, in response to a positive test result, into a capture process that automatically navigates a system under test and captures resulting screenshots to support the defined customer journey including highlights on image of user required selections.

At step S614, the process 600 may include store the validation steps, test scenarios and resulting screenshots and videos on to a database, wherein the resulting screenshots and videos are accessed by an application that an end user leverages to see digital experiences to facilitate the customer journey.

According to exemplary embodiments, the process 600 may also include systemically and dynamically capturing the digital experiences from the database and presenting the captured digital experiences onto a user interface implemented onto the application.

According to exemplary embodiments, the process 600 may further include: creating additional contents as overlays of the digital experience; linking test results to annotations using a unique ID as a key link along with the overlays; and displaying the overlays to the user of the application presenting the digital experience.

According to exemplary embodiments, the process 600 may further include: defining the corresponding validation steps needed to accomplish the defined customer journey in end-user friendly narratives.

According to exemplary embodiments, the process 600 may further include: annotating end-user guide notes and texts or user-friendly narratives corresponding to the defined customer journey; automatically applying the annotated end-user guide notes and texts or user-friendly narratives in refreshed execution of the test scenarios and documentation and linking annotations to the customer journey validation step.

According to exemplary embodiments, in defining the test execution parameters, the process 600 may further include; defining device type; defining operating system; defining browser type; and defining desired configurable language.

According to exemplary embodiments, the process 600 may further include: assigning a unique identifier for the customer journey and each validation step.

According to exemplary embodiments, the process 600 may further include: automatically executing the test scenarios on a timed or regular basis or on demand.

According to exemplary embodiments, in the process 600, the captured digital experiences may include search of customer journeys and selection of operating system, language, and/or browser selection options.

According to exemplary embodiments, the process 600 may further include: dynamically updating customer journey validation scripts such that the customer journey automatically inherits the updates; and automatically running a customer journey validation script with the inherited updates at a subsequent scheduled time.

According to exemplary embodiments, in executing the test scenarios, the process 600 the process 600 may further include; capturing, by a test execution platform, screen shots and animations or videos of each digital experience, wherein links to each test step is captured to provide ability to later link the test step to a narrative which is displayed to the end user via the user interface.

According to exemplary embodiments, in the process 600, the user interface may be configured to allow narrative authors to capture and link appropriate narratives to each step in a test scenario; and display the narratives in conjunction with corresponding screen shots.

According to exemplary embodiments, the ADECD 402 may include a memory (e.g., a memory 106 as illustrated in FIG. 1) which may be a non-transitory computer readable medium that may be configured to store instructions for implementing a platform, language, database, and cloud agnostic ADECM 406 for systemically and dynamically capturing digital experiences as disclosed herein. The ADECD 402 may also include a medium reader (e.g., a medium reader 112 as illustrated in FIG. 1) which may be configured to read any one or more sets of instructions, e.g., software, from any of the memories described herein. The instructions, when executed by a processor embedded within the ADECM 406 or within the ADECD 402, may be used to perform one or more of the methods and processes as described herein. In a particular embodiment, the instructions may reside completely, or at least partially, within the memory 106, the medium reader 112, and/or the processor 104 (see FIG. 1) during execution by the ADECD 402.

According to exemplary embodiments, the instructions, when executed, may cause a processor embedded within the ADECM 406 or the ADECD 402 to perform the following: defining customer journeys; defining corresponding validation steps needed to accomplish the defined customer journey; building test scenarios corresponding to the defined validation steps; defining, in response to building the test scenarios, test execution parameters; executing the test scenarios based on the test execution parameters; feeding the defined validation steps, in response to a positive test result, into a capture process that automatically navigates a system under test and captures resulting screenshots to support the defined customer journey including highlights on image of user required selections; storing the validation steps, test scenarios and resulting screenshots and videos on to a database, wherein the resulting screenshots and videos are accessed by an application that an end user leverages to see digital experiences to facilitate the customer journey; systemically and dynamically capturing the digital experiences from the database; and presenting the captured digital experiences onto a user interface implemented onto the application. According to exemplary embodiments, the processor may be the same or similar to the processor 104 as illustrated in FIG. 1 or the processor embedded within the ADECD 202, ADECD 302, ADECD 402, and ADECM 406 which is the same or similar to the processor 104.

According to exemplary embodiments, the instructions, when executed, may cause the processor 104 to further perform the following: defining the corresponding validation steps needed to accomplish the defined customer journey in end-user friendly narratives.

According to exemplary embodiments, the instructions, when executed, may cause the processor 104 to further perform the following: annotating end-user guide notes and texts or user-friendly narratives corresponding to the defined customer journey; automatically applying the annotated end-user guide notes and texts or user-friendly narratives in refreshed execution of the test scenarios and documentation; and linking annotations to the customer journey validation step.

According to exemplary embodiments, in defining the test execution parameters, the instructions, when executed, may cause the processor 104 to further perform the following: defining device type; defining operating system; defining browser type; and defining desired configurable language.

According to exemplary embodiments, the instructions, when executed, may cause the processor 104 to further perform the following: assigning a unique identifier for the customer journey and each validation step.

According to exemplary embodiments, the instructions, when executed, may cause the processor 104 to further perform the following: automatically executing the test scenarios on a timed or regular basis or on demand.

According to exemplary embodiments, the instructions, when executed, may cause the processor 104 to further perform the following: dynamically updating customer journey validation scripts such that the customer journey automatically inherits the updates; and automatically running a customer journey validation script with the inherited updates at a subsequent scheduled time.

According to exemplary embodiments, in executing the test scenarios, the instructions, when executed, may cause the processor 104 to further perform the following: capturing, by a test execution platform, screen shots and animations or videos of each digital experience, wherein links to each test step is captured to provide ability to later link the test step to a narrative which is displayed to the end user via the user interface.

According to exemplary embodiments as disclosed above in FIGS. 1-6, technical improvements effected by the instant disclosure may include a platform for implementing a platform, language, database, and cloud agnostic automatic digital experiences capturing module configured to systemically and dynamically capture digital experiences to support guided training, process and procedures, and job aids, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for systemically and dynamically capturing digital experiences by utilizing one or more processors along with allocated memory, the method comprising:
   defining customer journeys;
   defining corresponding validation steps needed to accomplish the defined customer journey;
   building test scenarios corresponding to the defined validation steps;
   defining, in response to building the test scenarios, test execution parameters;
   executing, by utilizing a test execution platform, the test scenarios for testing a system based on the test execution parameters;
   executing, by utilizing the test execution platform, the defined validation steps;
   capturing, by utilizing the test execution platform, screenshots and videos of the test associated with each digital experience, wherein links to each test step is captured to provide ability to later link the test step to a narrative which is displayed to the end user via a user interface;
   feeding the defined validation steps, in response to a positive test result, into a capture process that automatically navigates the system under test and captures resulting screenshots and videos of the test to support the defined customer journey including highlights on image of user required selections; and
   storing the validation steps, test scenarios and resulting screenshots and videos on to a database, wherein the resulting screenshots and videos are accessed by an application that an end user leverages to see digital experiences to facilitate the customer journey.

2. The method according to claim 1, further comprising:
   defining the corresponding validation steps needed to accomplish the defined customer journey in end-user friendly narratives.

3. The method according to claim 2, further comprising:
   annotating end-user guide notes and texts or user-friendly narratives corresponding to the defined customer journey;
   automatically applying the annotated end-user guide notes and texts or user-friendly narratives in refreshed execution of the test scenarios and documentation; and
   linking annotations to the customer journey validation step.

4. The method according to claim 1, wherein in defining the test execution parameters, the method further comprising:
   defining device type;
   defining operating system;
   defining browser type; and
   defining desired configurable language.

5. The method according to claim 1, further comprising:
   assigning a unique identifier for the customer journey and each validation step.

6. The method according to claim 1, further comprising:
   automatically executing the test scenarios on a timed or regular basis or on demand.

7. The method according to claim 1, wherein the captured digital experiences include search of customer journeys and selection of operating system, language, and/or browser selection options.

8. The method according to claim 1, further comprising:
   dynamically updating customer journey validation scripts such that the customer journey automatically inherits the updates; and
   automatically running a customer journey validation script with the inherited updates at a subsequent scheduled time.

9. The method according to claim 1, wherein the user interface is configured to allow narrative authors to capture and link appropriate narratives to each step in a test scenario; and
   display the narratives in conjunction with corresponding screen shots.

10. The method according to claim 1, further comprising:
    creating additional contents as overlays of the digital experience;
    linking test results to annotations using a unique ID as a key link along with the overlays; and
    displaying the overlays to the user of the application presenting the digital experience.

11. A system for systemically and dynamically capturing digital experiences, the system comprising:
    a processor; and
    a memory operatively connected to the processor via a communication interface, the memory storing computer readable instructions, when executed, causes the processor to:
    define customer journeys;
    define corresponding validation steps needed to accomplish the defined customer journey;

build test scenarios corresponding to the defined validation steps;

define, in response to building the test scenarios, test execution parameters;

execute, by utilizing a test execution platform, the test scenarios for testing a system based on the test execution parameters;

execute, by utilizing the test execution platform, the defined validation steps;

capture, by utilizing the test execution platform, screenshots and videos of the test associated with each digital experience, wherein links to each test step is captured to provide ability to later link the test step to a narrative which is displayed to the end user via a user interface;

feed the defined validation steps, in response to a positive test result, into a capture process that automatically navigates the system under test and captures resulting screenshots and videos of the test to support the defined customer journey including highlights on image of user required selections; and store the validation steps, test scenarios and resulting screenshots and videos on to a database, wherein the resulting screenshots and videos are accessed by an application that an end user leverages to see digital experiences to facilitate the customer journey.

12. The system according to claim 11, wherein the processor is further configured to:

define the corresponding validation steps needed to accomplish the defined customer journey in end-user friendly narratives;

annotate end-user guide notes and texts or user-friendly narratives corresponding to the defined customer journey;

automatically apply the annotated end-user guide notes and texts or user-friendly narratives in refreshed execution of the test scenarios and documentation; and linking annotations to the customer journey validation step.

13. The system according to claim 11, wherein in defining the test execution parameters, the processor is further configured to:

define device type;
define operating system;
define browser type; and
define desired configurable language.

14. The system according to claim 11, wherein the processor is further configured to:

assign a unique identifier for the customer journey and each validation step.

15. The system according to claim 11, wherein the processor is further configured to:

automatically execute the test scenarios on a timed or regular basis or on demand, wherein the captured digital experiences include search of test scenarios and selection of operating system or browser selection options.

16. The system according to claim 11, wherein the processor is further configured to:

dynamically update customer journey validation scripts such that the customer journey automatically inherits the updates; and automatically run a customer journey validation script with the inherited updates at a subsequent scheduled time.

17. The system according to claim 11, wherein the user interface is configured to allow narrative authors to capture and link appropriate narratives to each step in a test scenario; and display the narratives in conjunction with corresponding screen shots.

18. A non-transitory computer readable medium configured to store instructions for systemically and dynamically capturing digital experiences, the instructions, when executed, cause a processor to perform the following:

defining customer journeys;

defining corresponding validation steps needed to accomplish the defined customer journey;

building test scenarios corresponding to the defined validation steps;

defining, in response to building the test scenarios, test execution parameters;

executing, by utilizing a test execution platform, the test scenarios for testing a system based on the test execution parameters;

executing, by utilizing the test execution platform, the defined validation steps;

capturing, by utilizing the test execution platform, screenshots and videos of the test associated with each digital experience, wherein links to each test step is captured to provide ability to later link the test step to a narrative which is displayed to the end user via a user interface;

feeding the defined validation steps, in response to a positive test result, into a capture process that automatically navigates the system under test and captures resulting screenshots and videos of the test to support the defined customer journey including highlights on image of user required selections; and storing the validation steps, test scenarios and resulting screenshots and videos on to a database, wherein the resulting screenshots and videos are accessed by an application that an end user leverages to see digital experiences to facilitate the customer journey.

19. The non-transitory computer readable medium of claim 18, wherein the instructions, when executed, cause the processor to further perform the following:

defining the corresponding validation steps needed to accomplish the defined customer journey in end-user friendly narratives;

annotating end-user guide notes and texts or user-friendly narratives corresponding to the defined customer journey;

automatically applying the annotated end-user guide notes and texts or user-friendly narratives in refreshed execution of the test scenarios and documentation; and linking annotations to the customer journey validation step.

20. The non-transitory computer readable medium of claim 18, wherein the instructions, when executed, cause the processor to further perform the following:

dynamically updating customer journey validation scripts such that the customer journey automatically inherits the updates; and automatically running a customer journey validation script with the inherited updates at a subsequent scheduled time.

* * * * *